April 18, 1933.         R. P. WAGNER         1,904,181
BOOSTER
Filed April 23, 1929         4 Sheets-Sheet 2
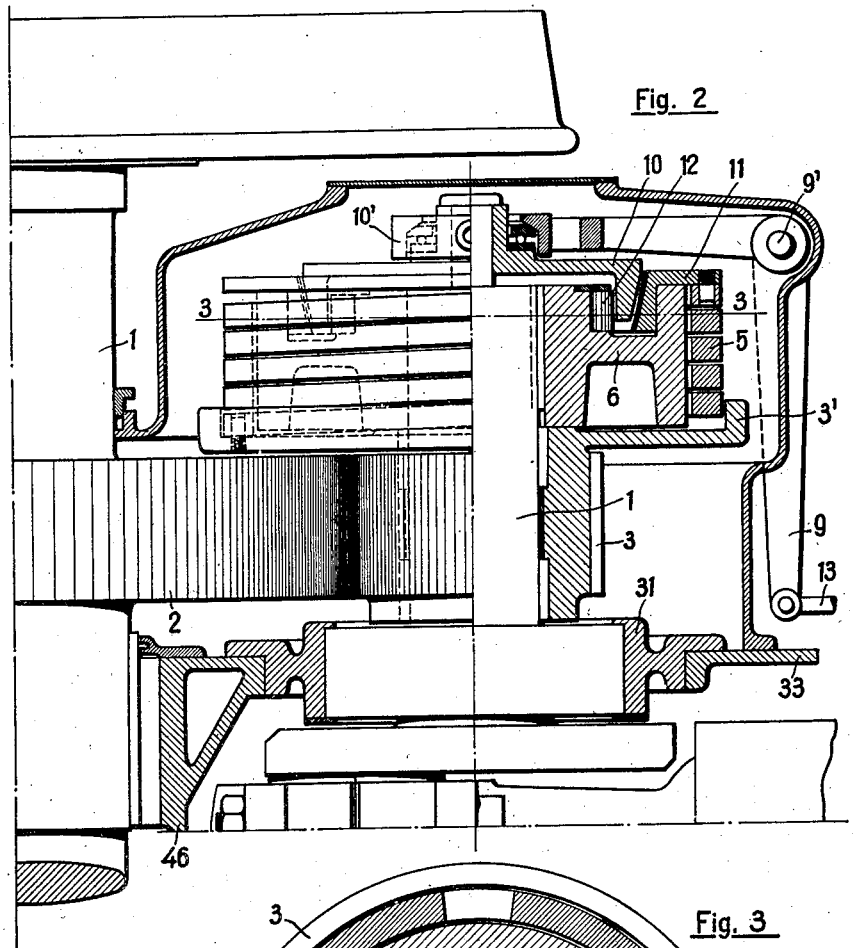
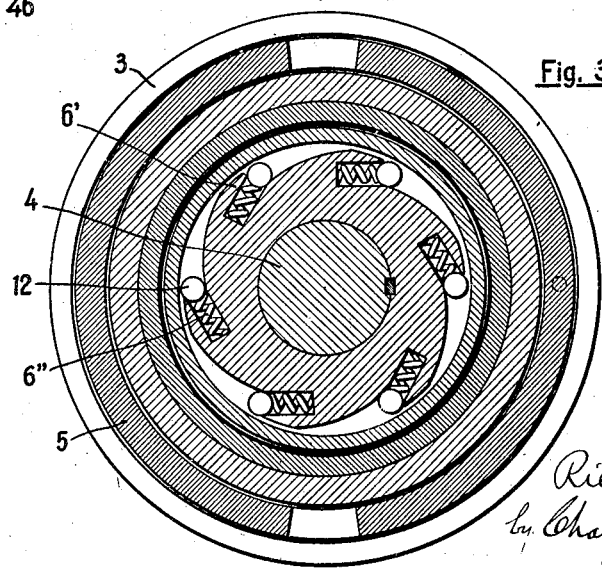
Inventor
Richard P. Wagner
by Chas. J. Williamson
Attorney

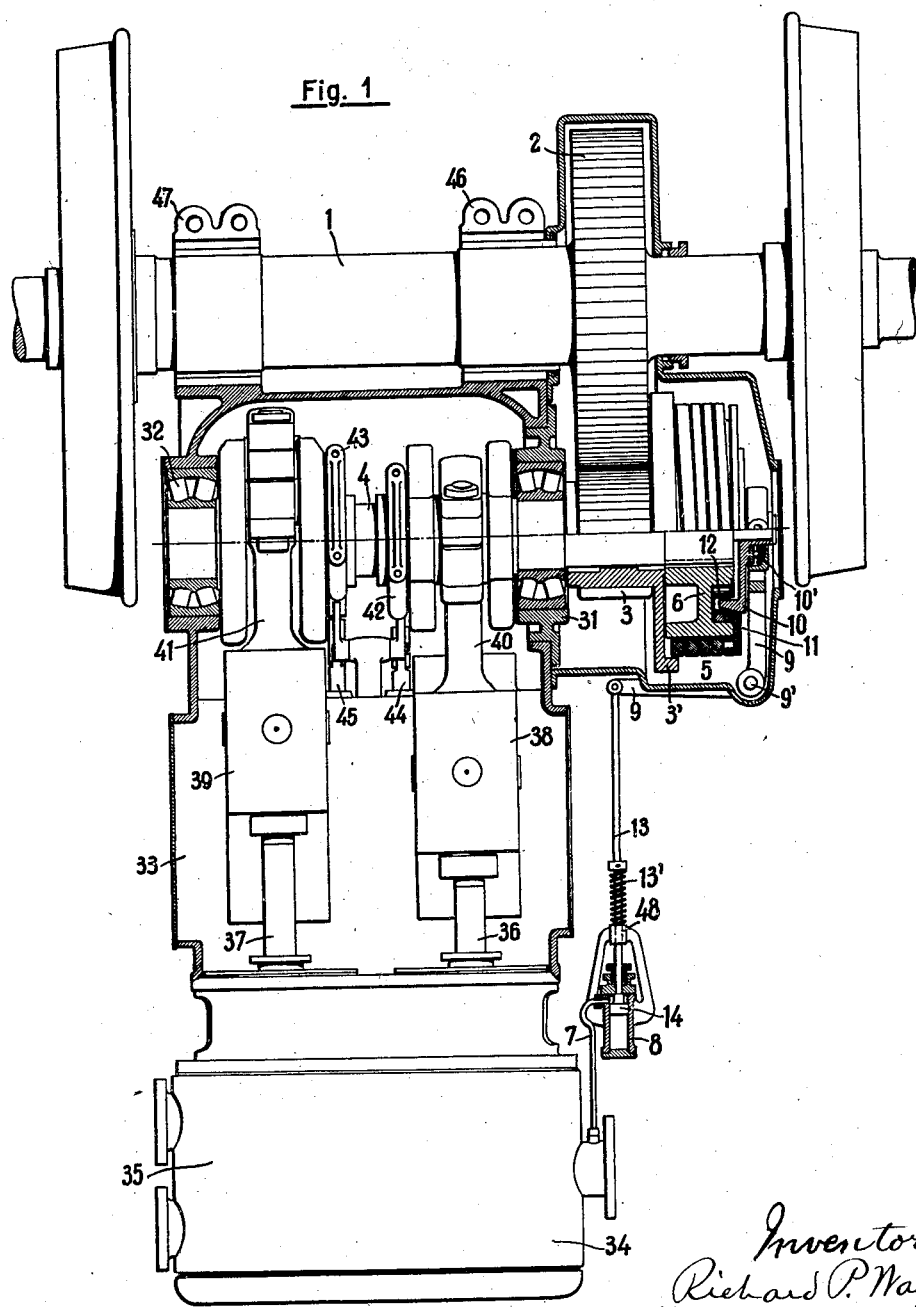

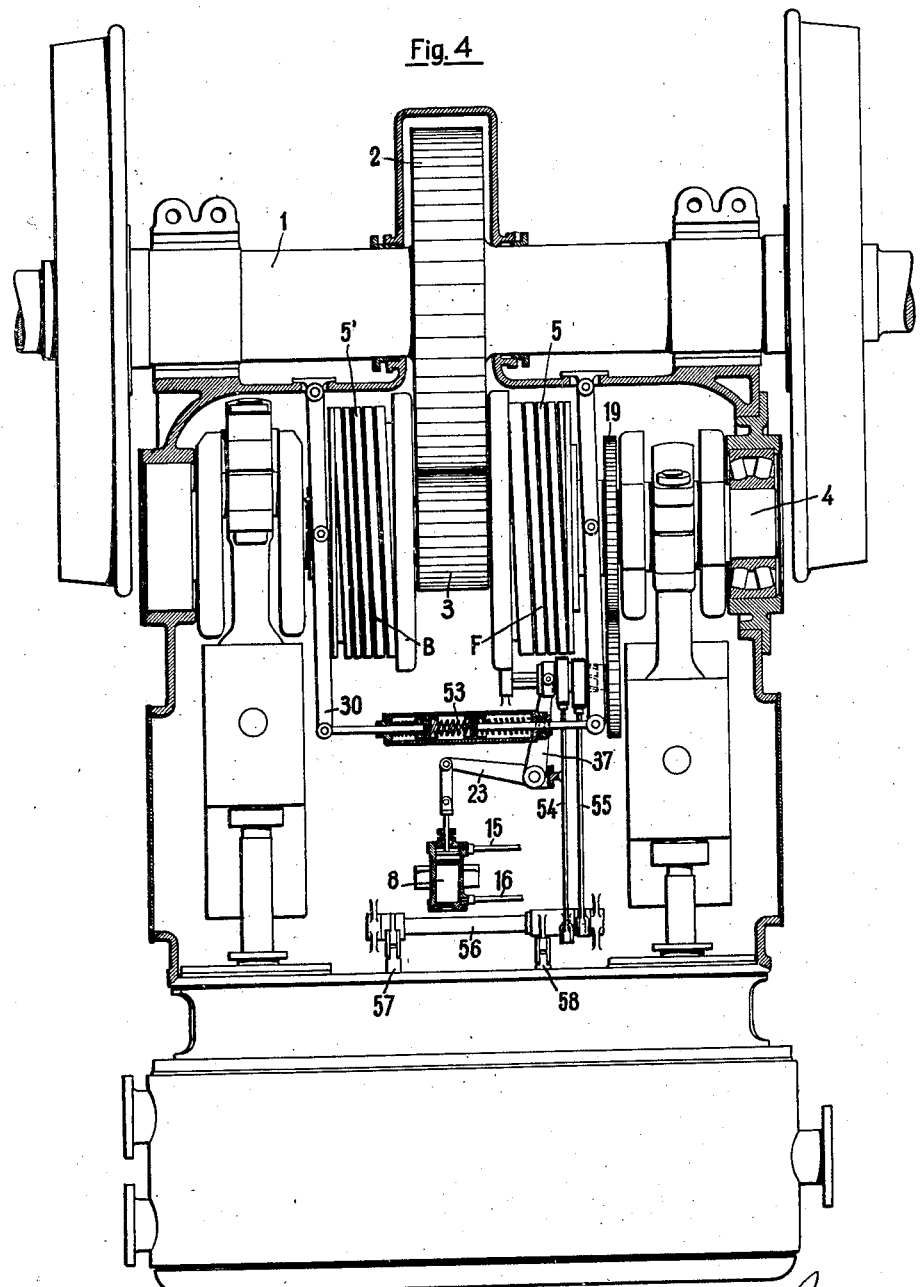

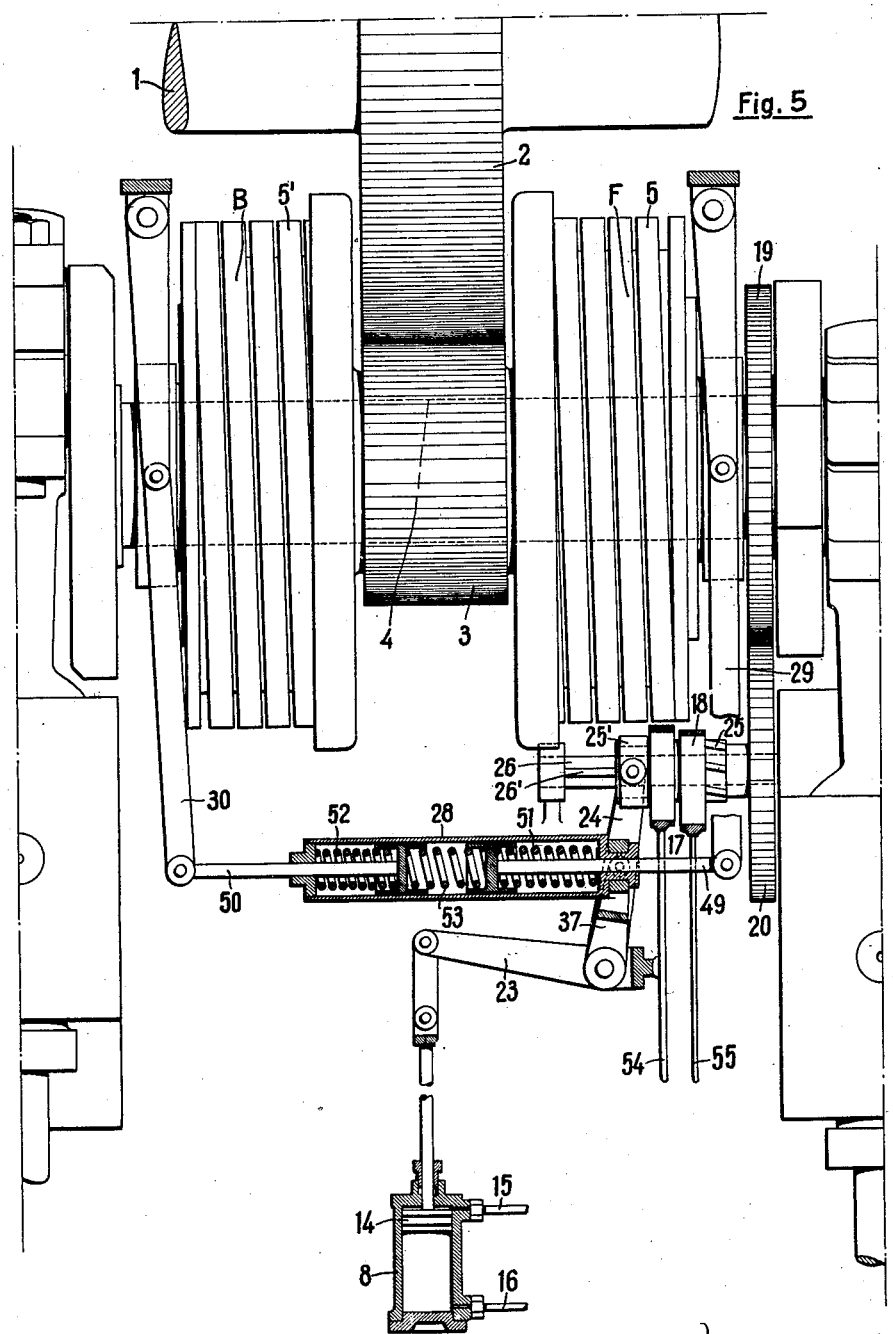

Patented Apr. 18, 1933

1,904,181

UNITED STATES PATENT OFFICE

RICHARD P. WAGNER, OF BERLIN-LICHTERFELDE, GERMANY

BOOSTER

Application filed April 23, 1929. Serial No. 357,439.

My invention relates to boosters, that is, auxiliary engines in locomotives which are operated together with the normal engine of the locomotive on gradients, or when starting.

My invention has particular reference to that type of booster in which the driving shaft of the booster engine is connected with the booster axle by a constant-mesh gear, and operative connection of the shaft and the axle is effected by a clutch.

It is an object of my invention to throw in the clutch gradually so as to avoid jerks, and to this end I provide means intermediate the driving and driven parts of the clutch which automatically effect a gradual setting of the clutch when the driving part leads with respect to the driven part.

In the accompanying drawings boosters embodying my invention are illustrated diagrammatically by way of example.

Fig. 1 is a plan view, partly in section, of a non-reversible booster,

Fig. 2 shows the slip and one-way clutches on a larger scale and partly in section, Fig. 3 is a section on the line 3—3 in Fig. 2, Fig. 4 is a partly sectional plan view of a reversible booster, Fig. 5 shows its clutching and reversing means on a larger scale.

Referring now to the drawings and first to Figs. 1, 2 and 3, 1 is the axle on which the booster is acting, 2 is a spur gear on the axle, 3 is a pinion meshing with the gear, and 4 is the crank shaft. 31 and 32 are bearings in a frame 33 in which the crank shaft 4 is carried, 34 and 35 are the cylinders of the booster with their piston rods 36, 37, cross heads 38, 39, and connecting rods 40, 41, 42 and 43 are eccentrics on the crank shaft 4, and 44, 45 are their straps which are connected with the slide valves of the cylinders by the usual means, not shown. 46 and 47 are brackets by which the frame 33 is supported on the axle 1.

The pinion 3 is free to turn on the crank shaft 4 and is equipped with a disk 3' to which one end of a coiled spring 5 is secured. 6 is a drum keyed on the end of the crank shaft beyond the pinion 3, 12 are rollers in the boss of the drum 6, 6' are serrations in the boss, and 6'' are springs inserted in bores of the serrations and exerting pressure on the rollers 12. 10 is a friction ring adapted to be displaced axially with respect to the drum 6, and engaged on its inner face by the rollers 12. The ring 10 is a clutching member which serves for connecting the drum 6 to the free end of the spring 5. It is mounted to rotate and to slide axially on the reduced end of shaft 4, and 11 is a friction washer adapted to be engaged by the beveled face of the friction ring 10 and to which the other end of the spring 5 is secured. The friction washer is housed in the drum 6 and is free to rotate in the drum. When the friction ring 10 is moved into engagement with the friction washer 11 the washer rotates with the shaft 4 and gradually winds the spring 5 about the drum 6 until the spring makes a positive connection of the washer 11 and the drum 6, and, as the other end of the spring 5 is secured to the disk 3' of the pinion 3, the shaft 1 is positively connected with the pinion 3. 9 is a bell-crank lever which is fulcrumed in the frame 33 at 9', 10' is a neck ring on the friction ring 10 which is engaged by the lever, 13 is a rod pivotally connected with the free end of the lever, 13' is a pullback spring on the rod which is inserted between a washer on the rod and a check 48 on the frame 33, 8 is a steam cylinder, 7 is a pipe supplying steam to the cylinder, and 14 is a piston on the cylinder at the end of the rod 13'.

When steam is admitted to the cylinder 8 the lever 9 is rocked about its pivot 9' to force the rings 10 and 11 into engagement so that the pinion 3 will be rotated by the crank shaft 4 but on account of the one-way clutch between the ring 10 and the drum 6 the pinion and the shaft will only rotate in unison after the rollers 12 have become jammed between the boss of the drum 6 and the ring 10. This will only happen when the speed of the crank shaft exceeds that of the friction washer or ring 11. This washer is connected with the pinion 3 by the spring 5. The washer 11 now starts to rotate, pulls the spring 5 tight and firmly connects the pinion 3 with the crank shaft 4.

It will be understood that the spur gear 2 and the pinion 3 are in constant mesh so that they will not engage with a jerk when the booster is started, and that the connection of the crank shaft 4 with the pinion 3 is effected gradually.

When steam is discharged from the cylinder 8 the spring 13 returns the bell-crank lever 9 into its initial position and breaks the connection of the ring 10 with the washer 11.

Referring now to Figs. 4 and 5, identical parts have been marked with the same reference numerals as in Figs. 1, 2, and 3. This booster is equipped with two clutches, one, "F", for forward, and the other, "B", for backward rotation of the axle 1. The clutches are designed like the clutch described with reference to Figs. 1, 2, and 3, their springs being marked 5 and 5', respectively. As each clutch operates in a single direction only, two of them must be provided.

In the reversible booster the cylinder 8 is provided with two pipes 15 and 16, one at each end, and its piston 14 is connected with the control levers of the two clutches F and B by a bell-crank lever 23, 37, the arm 37 engaging a sleeve 28 containing two rods 49 and 50, each with a spring 51 and 52, respectively, inserted between washers at the ends of the rods and a check at either end of the sleeve. A third spring 53 is inserted between the ends of the rods 49, 50, the rod 49 being connected with the control lever 29 of clutch F, and the rod 50 with the control lever 30 of clutch B.

The valve gear comprises two spur gears 19 and 20, 19 being keyed to the crank shaft 4 and 20 supporting two eccentrics 17 and 18 on a pin 26. Seated on the pin is a helically splined sleeve 25 in which corresponding helical ridges on the insides of the eccentric bosses are engaging. 24 is an extension of the arm 37 which engages a neck ring 25' on the sleeve 25, and 26' is a straight spline on the pin 26 on which the sleeve 25 is adapted to be displaced axially. When the sleeve is thus displaced the helical parts cause it to rotate so that the eccentrics are reversed. 54 and 55 are the eccentric straps, 56 is a shaft to which they are pivoted and 57, 58 are the valve rods to which motion is imparted from the shaft 56.

In the position illustrated steam has been admitted to the cylinder 8 by the pipe 16 and the piston 14 throws in the clutch B through the medium of sleeve 28 and spring 52. At the same time the extension 24 of the lever 37 reverses the eccentrics 17 and 18. When steam is admitted through the pipe 15 the clutch F is thrown in through the medium of sleeve 28 and spring 51. In this manner the springs in the sleeve are alternately put under tension and move the levers 29 and 30 into corresponding positions, throwing alternately in the clutches F and B. When both clutches are thrown out the spring 53 holds the parts in neutral position.

It is understood that clutches of other type than those described may be provided and that any other fluid than steam may be used for controlling the piston 14 in the cylinder 8.

I claim:

1. A booster comprising an axle, a crank shaft, a permanent-mesh gear operatively connecting said crank shaft and said axle, and a slip clutch in combination with a one-way clutch in said gear.

2. A reversible booster comprising an axle, a crank shaft, means for reversing said crank shaft, a permanent-mesh gear operatively connecting said crank shaft and said axle, and two clutching units each comprising a slip clutch and a one-way clutch in said gear.

3. A reversible booster comprising an axle, a crank shaft, means for reversing said crank shaft, a permanent-mesh gear operatively connecting said crank shaft and said axle, two clutching units each comprising a slip clutch and a one way clutch in said gear, and means for throwing in any one of said units and simultaneously operating said reversing means.

4. A reversible booster comprising an axle, a crank shaft, means for reversing said crank shaft, a permanent-mesh gear operatively connecting said crank shaft and said axle, two clutching units each comprising a slip clutch and a one-way clutch in said gear, and mechanism for throwing any one of said units and simultaneously operating said reversing means, said mechanism including spring means having a spring at either end which springs are operatively connected with one of said units, and a third spring inserted between said two springs and tending to hold said units in thrown-in position.

In testimony whereof I affix my signature.

RICHARD P. WAGNER.